Jan. 26, 1960 R. E. CRUMP 2,922,867
CONDUCTIVE SURFACE COVERAGE ELECTRICAL HEATING ELEMENTS
Filed May 8, 1958
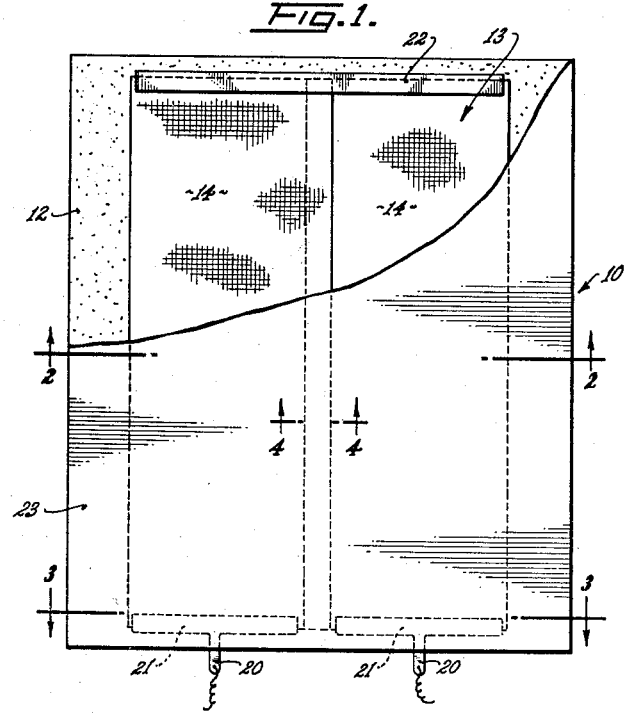
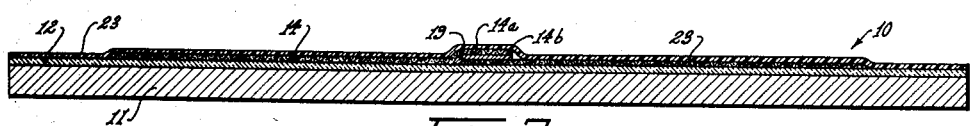
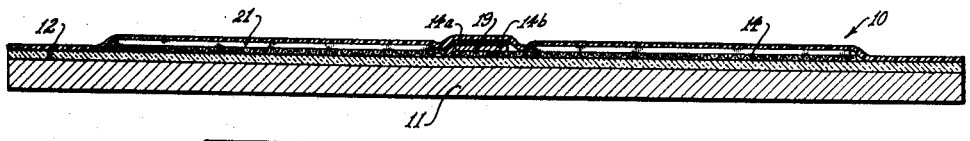
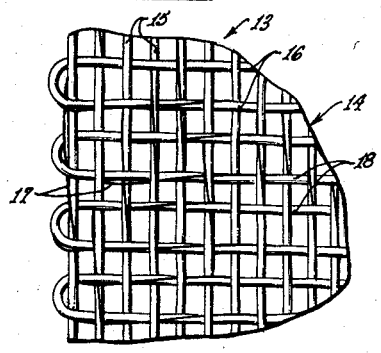
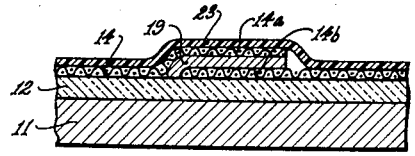
RALPH E. CRUMP
INVENTOR.
BY
ATTORNEY х
United States Patent Office 2,922,867
Patented Jan. 26, 1960

2,922,867

CONDUCTIVE SURFACE COVERAGE ELECTRICAL HEATING ELEMENTS

Ralph E. Crump, Granada Hills, Calif., assignor to Electrofilm, Inc., North Hollywood, Calif., a corporation of California Application May 8, 1958, Serial No. 733,868

4 Claims. (Cl. 219—46)

This invention has to do with improvements in materials and means for heating surface areas, typically of airborne parts such as wing surfaces for the prevention of ice formation or removal of ice therefrom, and is directed particularly to advancements in thin sheet-form materials applicable generally to limited or extended surface areas of work to be heated, and characterized by the ability of the material to assure continuity of heating over any selected area.

For various purposes and uses it is important that provision be made for continuous heating of a given surface area, in a manner permitting of no localized unheated portions of that area which for example in the case of a surface subject to icing, otherwise would permit formation of localized iced areas from which ice removal might not be possible as and when required. The invention provides an improved heating element structure and arrangement whereby a selected area may be heated continuously throughout its extent, either at uniform temperature as by electrical heating at uniform watt density, or at different temperatures within that area, as by current flow at different watt densities, the heating however in either case being continuous.

More specifically, the invention relates to heating composites in sheet-form employing preferably a base or carrier layer of thin insulative material desirably of organic plastic such as thermosetting resin, and preferably a fabric such as woven glass cloth impregnated with the resin. Being thin and flexible, the base layer is applicable and conformable to surface areas of various sizes, shapes and contours. This base layer carries a plurality of electrically conductive heating elements essentially of thin, flat band shape and extent which may be electrically energized correspondingly or differently, depending upon whether the surface area is to be uniformly or differentially heated. Thus the individual band-like heating elements may be electrically connected for series or parallel current flow therethrough, or one or more of the elements in a continuous assembly may be energized independently of the others, all dependent upon the requirements in a given situation.

Whatever may be the relation between the elements insofar as their electrical energization is concerned, the invention has for its object to provide for such association of the elements as will assure continuity of heating. In accomplishment of this object, extents of the heating element or elements are adhered to the carrier sheet with their edges in parallel overlapping relation, thus to assure continuity of heating by reason of the overlap. Current flow from one extent to the other of the element along their overlapped edges is prevented by inserting within the overlap an interlamination of thin strip insulation typically of sheet mica, asbestos, ceramic, vitreous enamel or suitable resin plastic composition. The overlapped element or elements and the carrier sheet base are integrated and given surface protective insulation by a thin coating of plastic or resin capable of physical and chemical stability at the operating temperature of the element.

Typical of such coatings usable also for the base layer are the thermosetting resins such as phenol formaldehyde, urea formaldehyde, melamine-modified formaldehyde and epoxide resins.

In the interests of assuring not only continuity of the heating at the overlapped extents of the element, but also within the element itself, I preferably use as the heating element material a weave in the nature of a fabric, composed of small cross-sectional area wires which most desirably run both longitudinally and transversely of the element. Very satisfactory results are obtained using a weave composed of both conductive wires alternating with strands of non-conductive material such as flexible glass, ceramic or asbestos fiber, or synthetic organic strands having adequate temperature stability. For details concerning this type of woven heating element, reference may be had to copending application Serial Number 644,070 having common ownership of the present application.

The various features and objects of the invention as well as the details of an illustrative embodiment, will be more clearly understood from the following detailed description of the accompanying drawing, in which:

Fig. 1 is a plan view of a typical composite of the base sheet and integrated heating element;

Figs. 2 and 3 are enlarged cross-sections taken on lines 2—2 and 3—3 of Fig. 1 showing also the base layer adhered to the surface of the work to be heated;

Fig. 4 is an enlarged cross-section taken on line 4—4 of Fig. 1; and

Fig. 5 is an enlarged fragmentary illustration of the wire mesh heating element.

In Figs. 1 to 4, the prepared heating element and carrier sheet composite, generally indicated at 10 is shown to be adhered as by suitable cement or one of the aforementioned thermosetting resins, to the surface of the work 11 to be heated. The sheet composite 10 is shown to comprise a base layer 12 of reinforced insulative material, typically though preferably a thermosetting resin-impregnated glass cloth. Applied to the surface of this thin base layer is the heating element generally indicated at 13 shown typically in Fig. 1 to comprise a plurality of thin band-shaped extents 14 of the conductive mesh or fabric given greatly enlarged illustration in Fig. 5. Here the material 14 is shown to be woven from warp strands 15 running longitudinally of the element, and fill strands 16 running transversely of the element, these strands being non-conductive and of a material such as glass fiber. Woven with strands 15 and 16 are the small conductive warp wires 17, say between 30 to 40 per inch transversely of the element, and the filler wires 18 running with strands 16. Being woven with the non-conductive strands, the wires or the parallel wires are insulatively spaced apart but otherwise they are electrically connected through cross weave engagement so that each wire functions in the nature of a bus to equalize the current flow through the other wires with which it has crosswise engagement. Such woven configuration assures complete uniformity of current flow and uniformity of heating throughout the area of the element, and it further assures preservation of that uniformity if for any reason one or more of the warp wires should locally be interrupted as by puncturing of the element, since all about the location of the puncture the mutually conductive and current distributive relation of the wires remains.

As will be understood, to serve the requirements of any particular heating installation, the number and extents of the element lengths 14 may be predetermined and used accordingly, and may be given appropriate electrical interconnections as mentioned in the foregoing. Merely as illustrative, the composite 10 is shown to comprise a pair of elements 14 placed on the base sheet 12 with their edge portions 14a and 14b in parallel overlapping relation. Interposed between the overlapped extents of the elements is a thin strip 19 of insulation such as sheet mica, which runs the full length of the overlap and electrically insulates against current flow from one to the other of the elements (assuming them to have differing potentials tending to cause the current flow) throughout the length of the overlap. In the example illustrated, the composite element has its power supply through the projecting terminals 20 of conductors 21 engaged against the surface of the weave 14 in electrical contact with its wires. For series flow of current through the element sections, the latter may be interconnected at their opposite ends by a similar thin conductor 22 running across and in electrical contact with the wires of both sections.

In preparation of the composite element 10, after application of the condutcive mesh 14 to the base sheet 12, the assembly is given an insulative coating 23, preferably of sprayed-on thermosetting resin which may be capable of air drying or may require appropriate heating for its cure. As illustrated in Figs. 2 to 4, the surface coating 23 completely seals in and insulates the wire mesh heating element extents, the interlaminated overlapping edges, and the conductors 21 and 22.

I claim:

1. A heating composite comprising a thin insulative base sheet adapted to be applied to a surface to be heated, thin elongated bands of electrical conductive heating material adhered to said base sheet with parallel edge portions of said bands overlapped, said bands being formed of woven material containing conductive wires, thin insulative strip material interposed between said edge portions within the overlap, and means for supplying to said bands electrical current the flow of which from one to an adjacent band at their overlap is prevented by said insulative material.

2. A heating composite as defined by claim 1, in which said wires run transversely and longitudinally of the bands.

3. A heating composite as defined by claim 1, in which said insulative material is mica strip.

4. A heating composite as defined by claim 1, in which said base sheet is resin-impregnated glass fabric, said bands being composed of woven conductive and non-conductive strands, conductive terminals connected to said bands, and a resinous coating applied to said base sheet and bands.

References Cited in the file of this patent

UNITED STATES PATENTS

| | | |
|---|---|---|
| 1,963,554 | McDill | June 19, 1934 |
| 2,345,300 | Simpson et al. | Mar. 28, 1944 |
| 2,503,457 | Speir et al. | Apr. 11, 1950 |
| 2,511,540 | Osterheld | June 13, 1950 |
| 2,522,542 | Schaefer | Sept. 19, 1950 |
| 2,712,591 | Rogell | July 5, 1955 |
| 2,719,907 | Combs | Oct. 4, 1955 |
| 2,759,092 | Fortin | Aug. 14, 1956 |
| 2,853,589 | Crooke | Sept. 23, 1958 |